United States Patent

Stark, Jr. et al.

[15] 3,701,845

[45] Oct. 31, 1972

[54] HUE CONTROL CIRCUIT FOR A COLOR TELEVISION RECEIVER

[72] Inventors: John Stark, Jr., Indianapolis, Ind.; David Harry Carpenter, Fairfield, Conn.

[73] Assignee: RCA Corporation

[22] Filed: Jan. 7, 1971

[21] Appl. No.: 104,625

[52] U.S. Cl. ....................178/5.4 HE
[51] Int. Cl. ....................H04n 9/02
[58] Field of Search .........178/5.4 HE, 5.4 MC, 5.4 B

[56] References Cited

UNITED STATES PATENTS

| | | | |
|---|---|---|---|
| 3,617,621 | 11/1971 | Cochran | 178/5.4 HE |
| 3,518,363 | 6/1970 | Funston et al. | 178/5.4 HE |
| 3,595,988 | 7/1971 | Kawamata et al. | 178/5.4 HE |
| 3,294,900 | 12/1966 | Kool | 178/5.4 HE |
| 2,888,514 | 5/1959 | Pritchard | 178/5.4 HE |
| 3,258,526 | 6/1966 | Beers | 178/5.4 AC |

*Primary Examiner*—Richard Murray
*Attorney*—Eugene M. Whitacre

[57] ABSTRACT

The hue of a color image is controlled by a variable resistor which shifts the phase of a generated reference carrier wave with respect to the phase of a received chrominance signal, and which also correspondingly shifts the background color of the reproduced picture so as to further obtain a more pleasing display on the color kinescope screen.

7 Claims, 7 Drawing Figures

INVENTORS
John Stark, Jr. &
David H. Carpenter.
BY
Charles Bruno Hoy
ATTORNEY

INVENTORS
John Stark, Jr. &
David H. Carpenter.
BY
Charles Bruckey
ATTORNEY

INVENTORS
John Stark, Jr. &
David H. Carpenter.
BY Charles Brodsky
ATTORNEY

HUE CONTROL CIRCUIT FOR A COLOR TELEVISION RECEIVER

BACKGROUND OF THE INVENTION

1. Field of the Invention

This invention relates to color television receivers and, more particularly, to a circuit arrangement for adjusting the hue of a televised image reproduced therein in full color while correspondingly adjusting the background color of the image so as to vary tint cast and obtain a more pleasing picture.

2. Description of the Prior Art

In the standardized color television system employed in the United States, four types of signal information are transmitted from the signal source. One type of information is the line and field deflection scanning synchronization information. A second type of information represents the brightness or luminance signal which conveys the black and white or monochrome image information. A third type of information is a chrominance signal comprising a color sub-carrier of 3.58 megahertz mean frequency, which is amplitude-modulated in accordance with the degree of saturation of the color being transmitted and which is phase-modulated in accordance with its hue. The fourth type of information is in the form of at least eight cycles of color synchronizing bursts transmitted during the blanking interval for each of the scanning lines and is used to provide reference phase information.

In many present day color television receiver systems, the chrominance signal is separated from the composite color television signal, amplified, and coupled to the color demodulator circuits. The color synchronizing bursts are also separated from the composite signal, amplified, and used to synchronize a reference carrier oscillator in the receiver, which oscillator develops a reference wave having a fixed phase with respect to the cycles of the color burst. This reference wave is then suitably coupled to the color demodulator circuits to synchronously demodulate the chrominance signal for the recovery of the color representative intelligence signals. The result of the synchronous demodulation of a color carrier are so-called "color difference" signals which, when combined with the brightness or luminance signal, produce respective signals representative of the primary colors in which the image reproduction is to be effected. The brightness and color difference signals are then impressed upon the tri-color kinescope image reproducing apparatus.

The phase of the reference wave generated in the color television receiver is determined by the color burst information so that the hue of the reproduced image will be the same as that of the scene televised. There are times, however, when it is desirable to be able to adjust the hue of the image as reproduced to overcome phase distortion of the chrominance signals that may occur in transmission, for example, or merely to comply with the dictates of personal taste.

Hue adjustment may be provided, according to one prior art teaching, by connecting a variable capacitor across one or more circuits in which the reference wave is generated and shifting the phase of the generated wave over a small angular range. Other prior art teachings provide hue adjustment by varying the setting of a resistor connected in series with one or more capacitors tuned to resonate with the winding of the reference oscillator output transformer or by changing the magnitude of a reverse biasing voltage applied across a semiconductor device or varactor diode to similarly change its exhibited capacitance and thus the phase of the oscillator generated color reference signals. However, with these and with other hue adjust arrangements, manual control to get pleasing flesh tones in a reproduced color image has been noted to give the reproduced image a bluish or greenish cast. At the same time, manual control of the hue adjust circuit to increase the green or blue content of a reproduced image undesirably changes flesh tones and, in general, introduces an error in all reproduced colors.

SUMMARY OF THE INVENTION

As will become clear hereinafter, the hue control circuit of the present invention operates to simultaneously change both color tint and color background so that tint control adjustment, for example, in a direction to increase the green content on the screen correspondingly changes the background color to enhance green, thereby lessening the overall tint control adjustment needed. As will be readily apparent, correspondingly smaller color errors will thus be introduced for other color contents of the reproduced image due to this lessening in tint change. Such background control is also desirable in monochrome transmission, as it enables the viewer to select the most pleasing shade for a reproduced black and white picture. This is so when the hue control circuit varies the background color by changing the bias potential applied to one or more of the picture tube electrodes, as described herein.

BRIEF DESCRIPTION OF THE DRAWINGS

These and other advantages of the present invention will become clear from a consideration of the following description taken in connection with the accompanying drawings in which.

DESCRIPTION OF THE PREFERRED EMBODIMENTS

Figure 1:
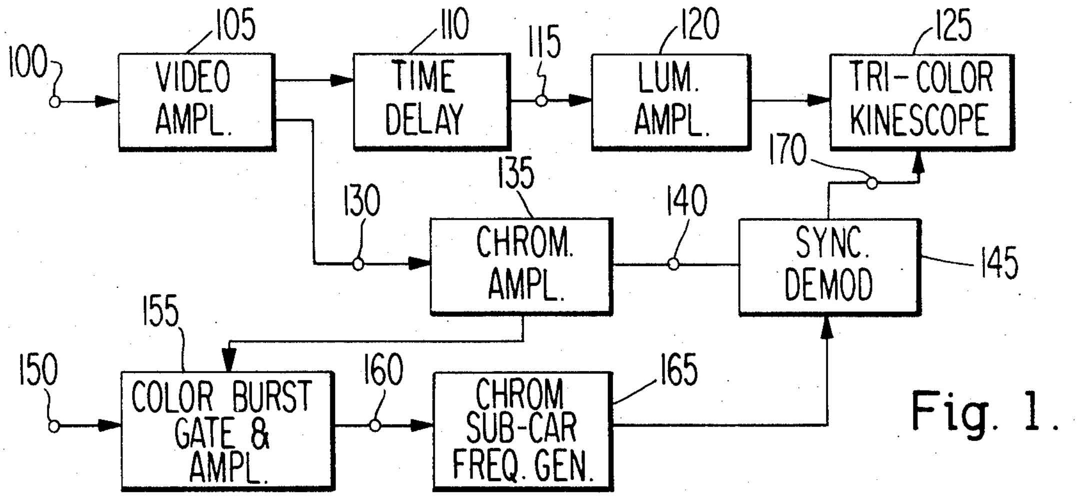
FIG. 1 is a block diagram of a portion of a color television receiver in which the present invention may be incorporated.

There is shown in FIG. 1 a block diagram of portions of a color television receiver to which the present invention is particularly applicable, and which receiver may otherwise comprise entirely conventional circuitry. The demodulated composite video signal is shown being applied to composite video signal input terminals 100 of a video frequency amplifying circuit 105. The luminance component of the composite video signal is applied by way of delaying circuit 110 to the input terminals 115 of a luminance signal amplifying circuit 120 for presentation to the input circuit of a tri-color kinescope image reproducing device 125. The composite video signal is also applied at input terminals 130 of a bandpass chrominance signal amplifying circuit 135 and the chrominance signal appearing at chrominance signal terminals 140 is applied to a synchronous demodulating circuit 145. A gating signal obtained by means of circuitry (not shown) and operating at the horizontal repetition rate is applied at gating signal input terminals 150 of a color burst gating and amplifying circuit 155 to which signals from the chrominance signal amplifying circuit 135 are also applied. The gated color burst appearing at color burst terminals 160 is applied to a chrominance sub-carrier frequency color reference wave generating circuit 165 from which color reference waves required for demodulating the chrominance signal are obtained and applied to the synchronous demodulating circuit 145. Color difference signals derived in the demodulating circuit 145 and appearing at output terminals 170 are applied to the tri-color kinescope 125 for mixing with the luminance signal to reproduce the televised image in color. The hue of the reproduced image can be adjusted by causing the phase of the color reference waves to be changed.

Before considering the actual circuit configurations of the invention for changing this reference wave, however, it would be advantageous at this point to review for a moment the function of a hue adjust circuit as employed in the NTSC television broadcast system employed in the United States. Thus, the hue adjust circuit in the NTSC system is normally used to correct errors which may be caused by disturbances that exist in the propagation path between the television transmitter and receiver, either between different transmitting stations or between different cameras located at the same station. These hue adjusts are manually controllable, for example, to correct any error that might be present in the relationship between the phase of the incoming color burst and the phase of the color reference oscillator in the receiver. Such circuits are also generally employed to lessen any noticeable background color error in the television transmission which gives the reproduced picture a predominant cast, or to adjust for such background errors as are caused in the receiver.

Where the hue control is adjusted to correct for background error, one possible adjustment made might be in a direction to enhance that color which is lacking in the picture or some other color which compensates to give a more pleasing image reproduction. Thus, where the picture on the television screen is low in green content or has a blue cast, the viewer generally attempts to compensate by adjusting the "tint" control in such a way as to increase the green content. If the picture on the receiver screen is high in red content or has a red cast, however, the viewer generally adjusts the "color" control of the receiver to reduce this saturation until a pleasing flesh tone is obtained. Whereas images having a reddish cast are subjectively less unpleasant than those having a greenish or bluish cast, adjustment of the "tint" control in these latter greenish or bluish cast instances with known circuit arrangements have been noted to change other image hues as well. Circuit arrangements according to the present invention, on the other hand, correspondingly change the background color of the image when the "tint" control is similarly adjusted. In this manner, the amount of adjustment necessary to enhance a green or blue cast by a subjectively comparable amount is reduced, and the remaining colors of the reproduced picture are thereby affected by a lesser amount.

Figure 2:
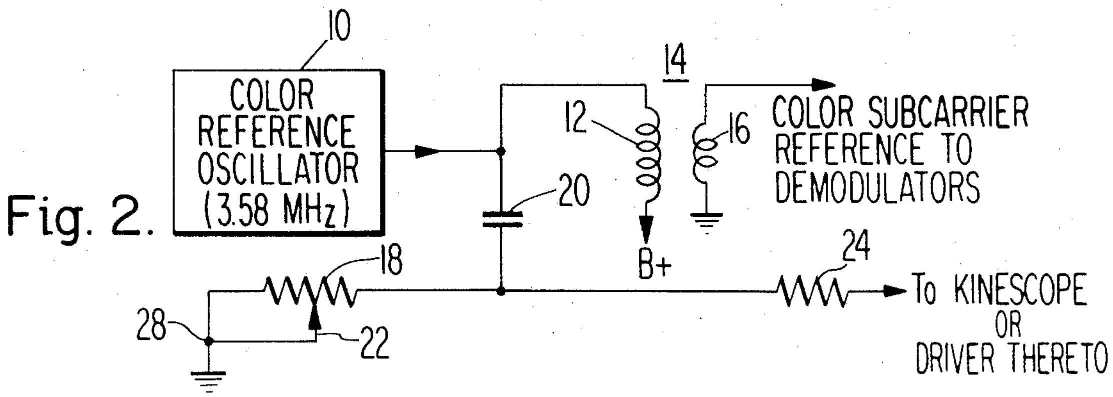
FIGS. 2–7 illustrate various manners of hue control circuits in accordance with the invention to change background color as the tint control function is accomplished.

Thus, FIG. 2 shows an arrangement which cooperatively combines the tint control function of the receiver with a background control function. A color reference oscillator 10 has its output terminal coupled to a source of energizing potential B+ through the primary winding 12 of the oscillator output transformer 14, the secondary winding 16 of which comprises the subcarrier reference signal circuit coupled to the color demodulator circuits, as indicated. The hue adjust control is represented by the variable "tint" resistor 18, having one terminal connected to a point of reference potential (such as ground 28) and a second terminal coupled to the output of the reference oscillator 10 by means of a capacitor 20. As will be appreciated, this arrangement serves to vary the phase of the signal generated across the primary winding 12 of transformer 14 over an angular range dependent upon the position of the slider 22 on the variable resistor 18. This "tint" control resistor 18 may be located at any convenient point on the television chassis by using a length of shielded cable to connect it in series with the capacitor 20 and across the primary winding 12 so as to shift the resultant resonant frequency of the transformer 14. In such arrangement, the shunt capacitance of the cable may comprise a portion of the total capacity required to shift the phase of the reference wave coupled to the color demodulators (as in FIG. 1) so as to enable a change to be made in the hue of the color image reproduced by the tri-color kinescope in response to the application of the chrominance signal to the demodulators. Similar phase shift control will follow the use of a fixed resistance device to couple the variable resistor 18 to the capacitor 20.

Corresponding with this use of a variable resistor 18 to effect hue adjustment is the use of a further resistor 24 to cooperatively combine with resistor 18 in effecting variations in background color. Shown as having one terminal coupled to the junction of resistor 18 and capacitor 20, resistor 24 will be understood as having its other terminal connected to at least one electrode of the tri-color kinescope at which a direct potential appears in establishing its operating point. For example, where the end of resistor 24 remote from resistor 18 is coupled to the control grid of the kinescope, the combination of resistors 24 and 18 together serve as a variable load to reduce its applied bias voltage. Alternatively, the end of resistor 24 remote from capacitor 20 might be coupled to the cathode electrode of the kinescope (or to the screen grid), to likewise vary the operating point of the picture tube gun. Thus, variation of the resistor slider 22 to effect such phase change as would enhance green content in the reproduced image, for example, can be cooperatively combined with resistor 24 so as to vary the potential of an appropriate electrode of the kinescope to enhance its emitted green light, as well. The result of such arrangement is that comparable enhancement of green content can be provided by altering the tint control resistor 18 by a significantly lesser amount than would be necessary if such background color control were absent. The arrangement thus proves attractive in that any errors which might tend to be produced in other color contents through use of previously employed hue adjusts will be reduced since the "tint" control resistor will be varied through a significantly reduced range.

Figure 3:
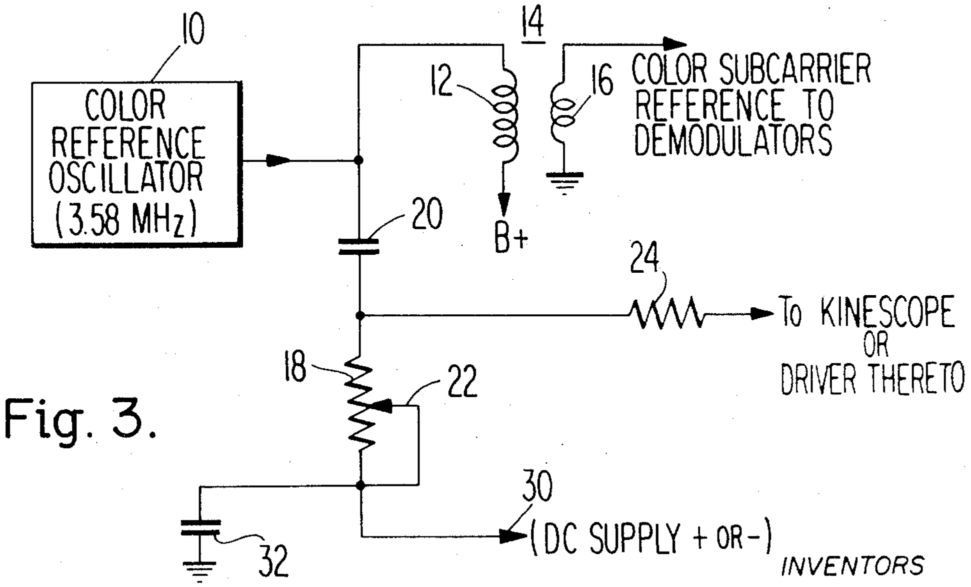

The arrangement of FIG. 3 is similar to that shown in FIG. 2, but differs therefrom in that the variable "tint" control resistor 18 is coupled to a source of direct operating potential 30 rather than to a point of ground potential 28. Again, depending upon the specific coupling of resistor 24 to the operating point electrodes of the kinescope, the "tint" control resistor 18 may be connected either to a positive supply source or to a negative supply source.

As with the FIG. 2 configuration, adjustment of the slider 22 in FIG. 3 effects the phase change of the reference carrier wave by varying the frequency to which the reference oscillator transformer 14 is tuned, and similarly varies the bias on the kinescope gun to vary background color. A capacitor 32 is also included in the FIG. 3 circuit, coupled between the supply source 30 and ground, to bypass any alternating signals that might there exist. Capacitor 32 is selected to further exhibit a low reactance at the frequency of the generated color sub-carrier so that its inclusion would not interfere with the range of phase control regulated by the reactance of capacitor 20.

Figure 4:
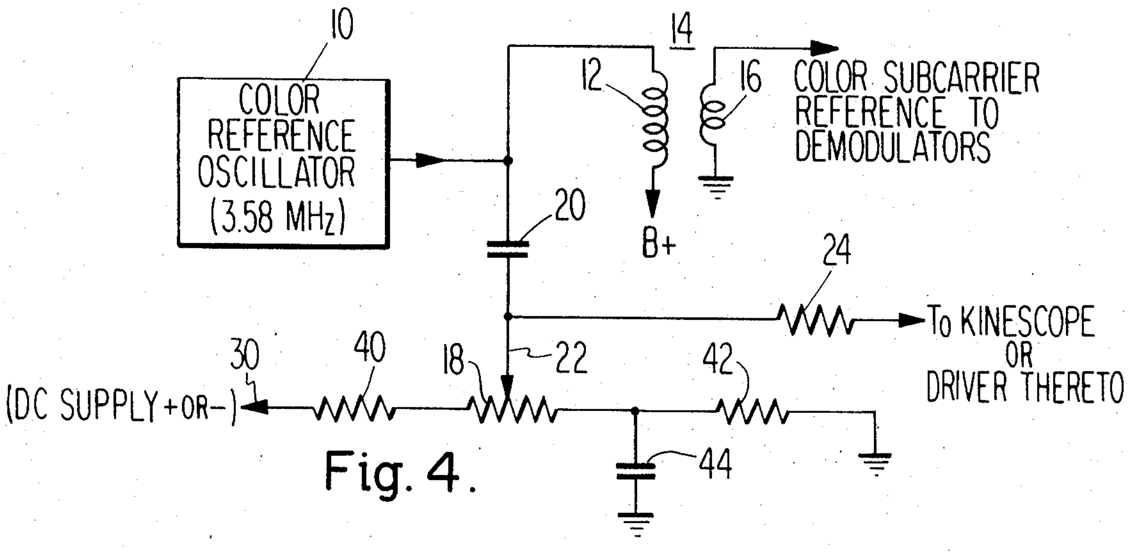

The arrangement of FIG. 4 shows another configuration permitting cooperative variation of reference carrier phase and kinescope operating point bias with the use of a source of direct operating potential 30. Here, a resistor 40 couples one terminal of the "tint" control resistor 18 to the supply source 30 (positive or negative depending upon the particular connection to the kinescope electrodes), while a further resistor 42 couples the other terminal of resistor 18 to ground. Selection of these two resistors establishes the available range of control voltage developable across resistor 18 so as to limit the effective change in bias on the color kinescope. In this respect, the resistance value of resistor 40 is chosen comparatively large compared to the resistance of the "tint" control 18, while the capacitor 44 which couples the junction of resistors 18 and 42 to ground, is, as before, chosen of a value to exhibit a low reactance at the frequency of the generated color sub-carrier.

In each of these three arrangements, therefore, the usual function of the hue adjust circuit continues — namely, to provide an AC impedance variation in conjunction with capacitor 20 so as to shift the phase of the reference sub-carrier signal coupled to the demodulator circuits. In addition, the use of an additional resistor 24 serves to combinedly connect a DC circuit to the operating electrodes of the kinescope gun to provide background color control and to additionally isolate the tint circuit at high frequencies. As will be readily apparent to one skilled in the art, the AC impedance variation provided by the tint control resistor may also be employed with pulse DC restoration circuits to alter the DC level at which the stabilization occurs. Such an arrangement is desirable in that it also permits a change of background to be made on monochrome transmission to select a desired shade of picture "blackness," and with the same control used on color transmissions to obtain the subjectively pleasing display there desired.

Figure 5:
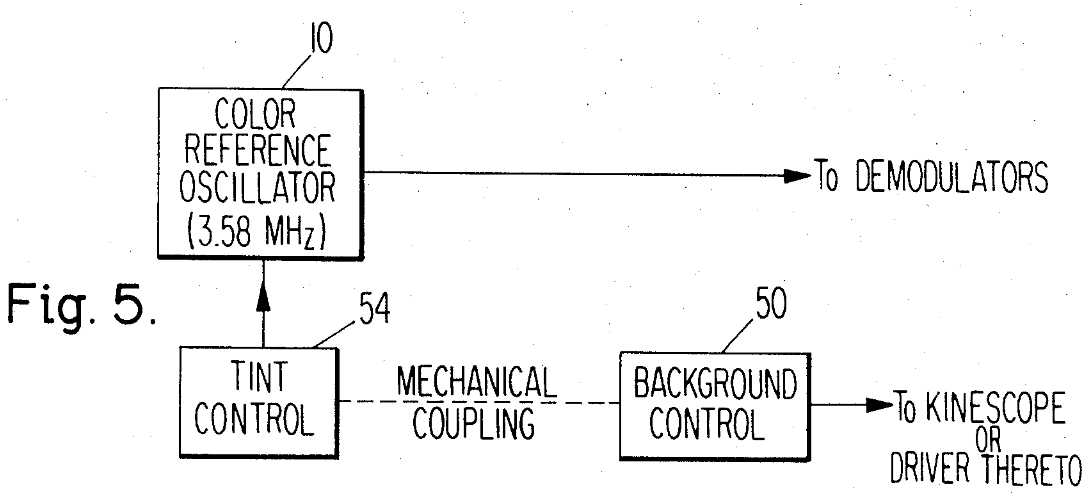

The illustrative arrangement shown in FIG. 5 is usable in those receiver constructions where a separate control 50 is made available to the viewer for varying the background color in a reproduced picture. Such control might exist as a variable resistor to independently adjust the bias potential on the kinescope gun or, as in the invention, might additionally include a mechanical coupling to the tint control resistor arrangement 54 as will cooperatively vary the background control resistor in response to a corresponding variation of "tint" control. As will be apparent, such complementary coupling can be effective to provide increased positive voltages to the picture tube electrodes or increased negative voltages, to further vary background color depending upon the mode in which the control is effected, i.e., by applying the voltage to the cathode, control grid or screen grid electrodes of the display device, directly or via driver stages coupled to these electrodes, as indicated.

Figure 6:
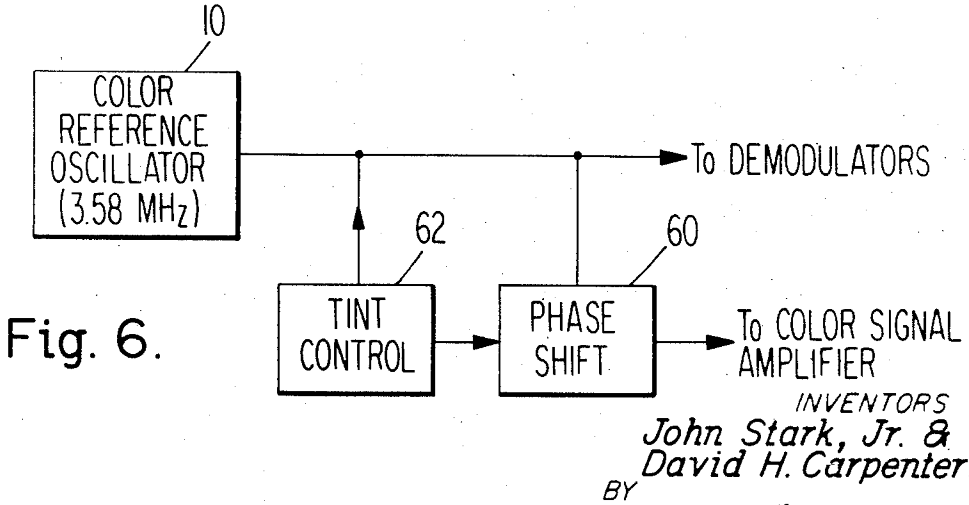

The configuration of FIG. 6 similarly is one in which cooperative action exists between the "tint" and background color controls, but differs from the preceding arrangements in that the background control is effected in a manner different from the variation of bias potential at the cathode-ray kinescope. Here, a portion of the reference sub-carrier generated by oscillator 10 is phase shifted a desired amount by the control 60 to yield a signal to be added to the chrominance signal coupled to the appropriate synchronous demodulator of the receiver. In this manner, the background color shift can be varied independently of the tint control adjustment, if desired, or may be coupled to the output of the tint control 62 (as shown) to depend therefrom. Such dependent arrangement offers the advantages of varying the degree of background color shift obtainable with the control 60 and preventing any shift in background color which might tend to be produced with the bias control arrangements when a color transmission changes to a monochrome transmission, for example.

Figure 7:
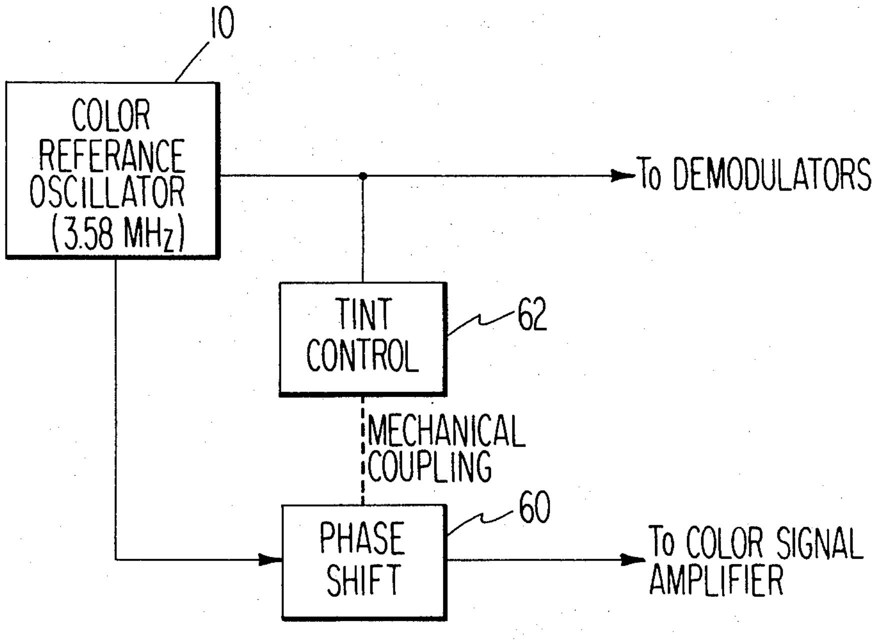

FIG. 7 illustrates another manner of injecting desired phase and/or amplitude components of the reference oscillator into the color signal, wherein the second control 60 mechanically couples to the output of the tint control 62 as well as to the oscillator 10.

While there have been described what are presently regarded as preferred embodiments of the present invention, it will be apparent that modifications may be made without departing from the true spirit of the invention. Therefore, it is intended that the appended claims shall cover all such variations as fall within the teachings described herein that a more pleasing display can be obtained on a color kinescope by varying the background color of the reproduced television image as its hue is adjusted.

What is claimed is:

1. In a color television receiver having a cathode-ray kinescope for reproducing a color image in response to a received composite signal including a modulated sub-carrier conveying chrominance information and periodically recurring synchronizing bursts of oscillation at the frequency of said sub-carrier and wherein said receiver is of the type including an oscillator for generating a color reference signal having the same frequency as and being in phase with said synchronizing bursts and a demodulator for recovering said chrominance information by combining said sub-carrier with said reference signal, the combination comprising:

a tint control, continuously adjustable over its intended range of operation, coupled to said oscillator for shifting the phase of the reference signal generated thereby relative to the phase of said periodically recurring synchronizing bursts as said control is selectively adjusted in accordance with individual viewer preference, to vary the hue of the reproduced color image as a function of the change in recovered output information from said demodulator; and a color background control coupled to said tint control and to said cathode-ray kinescope and being responsive to selective adjustment of said tint control over its range of operation to cooperate therewith and correspondingly vary the operating point of said kinescope and the background color of said reproduced image as said tint control is continuously adjusted to vary said image hue;

whereby control of any one color component in the reproduced image to produce subjectively comparable effects is achieved with said combination by a lesser variation of hue than is needed when such corresponding variation of background color is absent, and is achieved in a manner as to reduce undesired changes in remaining color components of the image as are produced from said hue variation in the absence of such background color control.

2. The combination of claim 1 wherein said color background control is coupled to said cathode-ray kinescope to vary the operating point of those electron guns included therein which are associated with the color component of the reproduced image being subjectively controlled.

3. The combination of claim 2 wherein said color background control is coupled to said cathode-ray kinescope to vary a bias potential developed at those electron guns thereof which are associated with said reproduced color component of interest.

4. The combination of claim 2 wherein said color background control is coupled to said cathode-ray kinescope to apply a bias potential to those electron guns thereof which are associated with said reproduced color component of interest, with said bias potential being variable in accordance with the change in recovered demodulator information produced as a function of said hue variation.

5. The combination of claim 2 in a color television receiver also including an output transformer having a primary winding coupled to said reference signal oscillator and a secondary winding coupled to said demodulator, wherein said tint control includes a capacitance and variable resistance serially coupled across said primary winding and wherein said color background control includes an added resistance coupled from the junction of said two components to said cathode-ray kinescope such that adjustment of said variable resistance changes both the resonant frequency of said primary winding and the operating point of those electron guns of the kinescope to which said added resistance is coupled.

6. The combination of claim 5 wherein a first terminal of said variable resistance is coupled to a point of ground potential and said added resistance is coupled to said cathode-ray kinescope at a point at which a bias potential is developed for those electron guns thereof which are associated with said reproduced color component of interest.

7. The combination of claim 5 wherein a first terminal of said variable resistance is coupled to a point of direct potential and said added resistance is coupled to said cathode-ray kinescope at a point to apply a bias potential to those electron guns thereof which are associated with said reproduced color component of interest.

* * * * *